United States Patent
Yoshida

(10) Patent No.: US 11,190,658 B2
(45) Date of Patent: Nov. 30, 2021

(54) IMAGE READING APPARATUS

(71) Applicant: CANON KABUSHIKI KAISHA, Tokyo (JP)

(72) Inventor: Satoshi Yoshida, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/081,565

(22) Filed: Oct. 27, 2020

(65) Prior Publication Data

US 2021/0152704 A1    May 20, 2021

(30) Foreign Application Priority Data

Nov. 15, 2019  (JP) .............................. JP2019-207356
Oct. 12, 2020  (JP) .............................. JP2020-172136

(51) Int. Cl.
  *H04N 1/04* (2006.01)
  *H04N 1/00* (2006.01)

(52) U.S. Cl.
  CPC ..... *H04N 1/00748* (2013.01); *H04N 1/00689* (2013.01); *H04N 1/00692* (2013.01); *H04N 1/00694* (2013.01); *H04N 1/00718* (2013.01); *H04N 1/00755* (2013.01)

(58) Field of Classification Search
  None
  See application file for complete search history.

(56) References Cited

U.S. PATENT DOCUMENTS

| | | | | |
|---|---|---|---|---|
| 2003/0038986 A1* | 2/2003 | Washio | .................... | G06T 3/606 358/474 |
| 2013/0083367 A1* | 4/2013 | Hara | ...................... | B65H 29/60 358/449 |
| 2015/0009520 A1* | 1/2015 | Yamada | .................. | H04N 1/387 358/1.14 |
| 2016/0037008 A1* | 2/2016 | Mori | ................... | H04N 1/00748 358/518 |
| 2016/0127606 A1* | 5/2016 | Yabuuchi | ............. | H04N 1/3878 358/1.12 |
| 2017/0048410 A1* | 2/2017 | Noro | .................. | H04N 1/40056 |
| 2018/0054546 A1* | 2/2018 | Mori | .................. | H04N 1/00602 |
| 2019/0238703 A1* | 8/2019 | Seki | .................... | H04N 1/00726 |
| 2020/0235782 A1 | 7/2020 | Yoshida | | |
| 2020/0244837 A1* | 7/2020 | Tsukahara | .......... | H04N 1/00092 |

FOREIGN PATENT DOCUMENTS

JP    2010-118911        5/2010
JP    2010206696 A   *  9/2010

* cited by examiner

*Primary Examiner* — Dung D Tran

(74) *Attorney, Agent, or Firm* — Venable LLP

(57) ABSTRACT

An image reading apparatus determines an inclination amount corresponding to an inclination angle of a leading edge of an original document in a conveyance direction, and determines the length of the original document in the conveyance direction. The image reading apparatus sets a first value as a set value in a case that the length of the original document is a first length and sets a second value larger than the first value as the set value in a case that the length of the original document is a second length shorter than the first length. If the inclination amount is smaller than the set value, inclination correction for correcting the image represented by the image data is performed such that the inclination amount is reduced, and if the inclination amount is larger than the set value, the inclination correction is not performed.

5 Claims, 9 Drawing Sheets

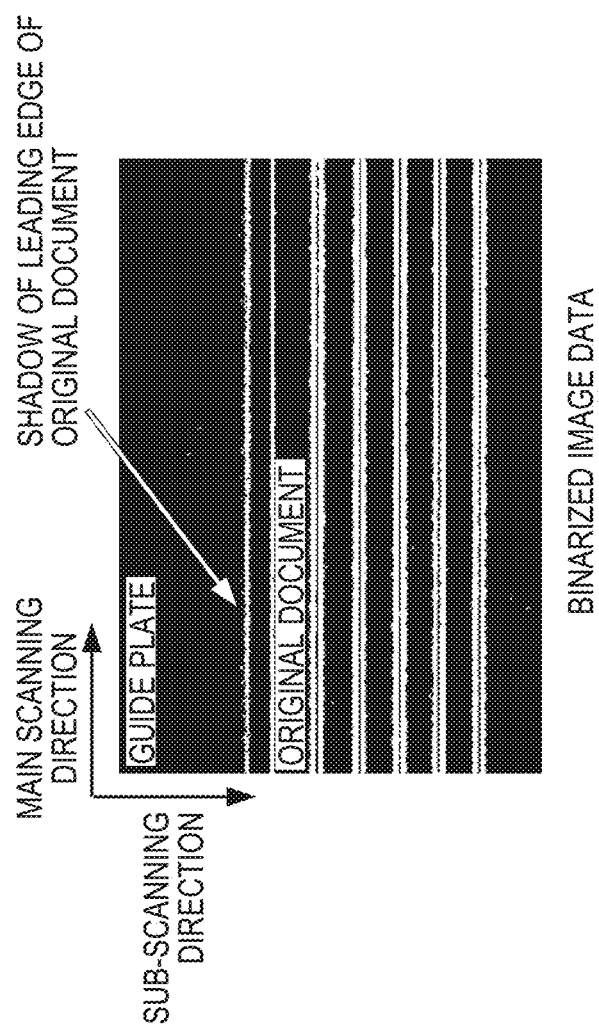

RELATIONSHIP BETWEEN SUB-SCANNING SIZE OF ORIGINAL DOCUMENT AND SKEW ANGLE

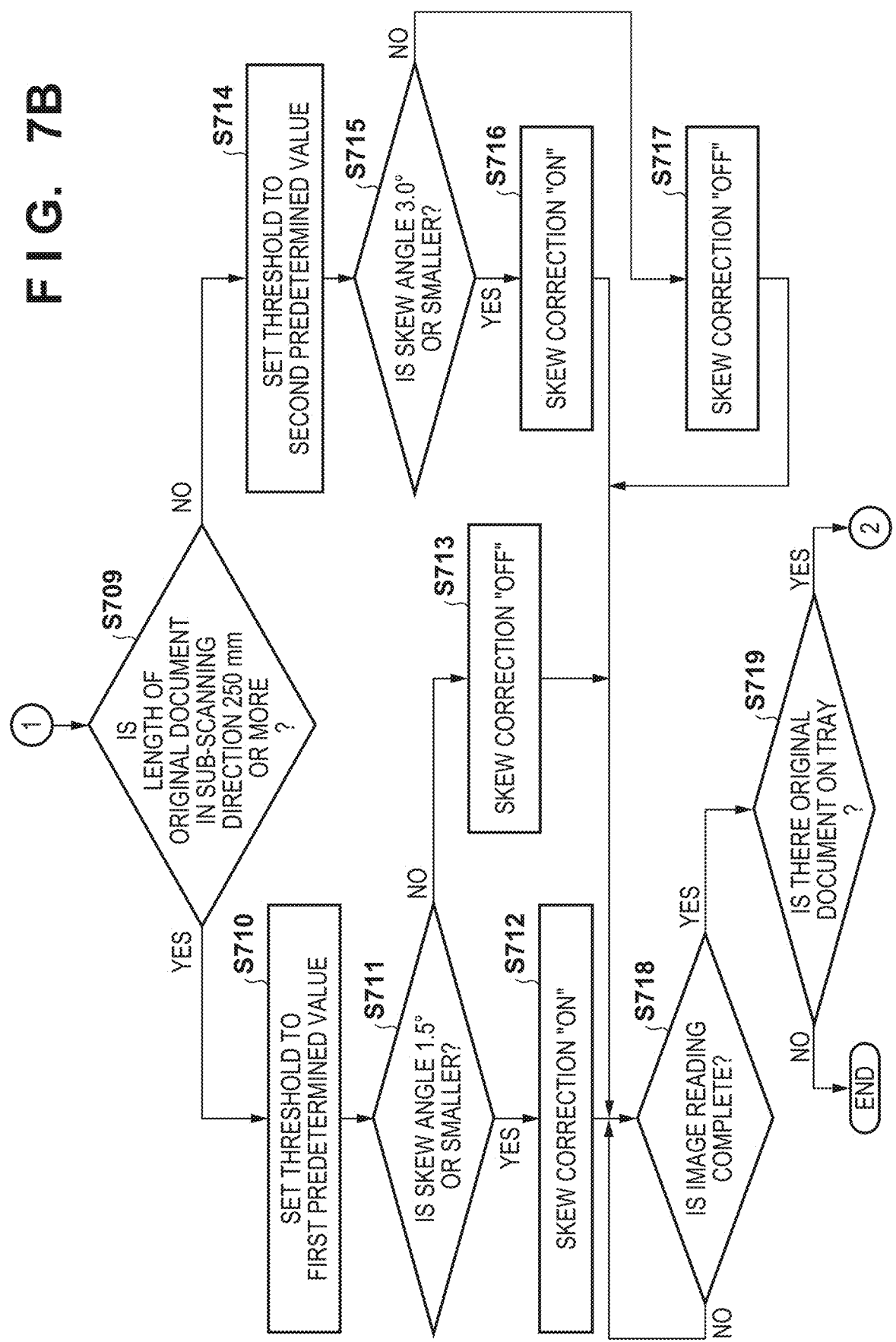

IMAGE READING APPARATUS

BACKGROUND OF THE INVENTION

Field of the Invention

The present invention relates to an image reading apparatus that reads an image of a conveyed original document.

Description of the Related Art

In the related art, there is known a document reader that conveys an original document placed on a document tray by an auto document feeder (hereinafter, referred to as an ADF) and reads an image of the original document conveyed by the ADF.

In the ADF, due to a pressure for separation of original documents, a sliding resistance of a tray, a manufacturing error of a roller used when conveying the original document, or the like, the original document may be conveyed in a state in which an edge on a leading end side of the original document in a conveyance direction is inclined with respect to a main scanning direction orthogonal to the conveyance direction. When the original document is conveyed in a state in which the edge on the leading end side of the original document is inclined with respect to the main scanning direction, an image indicated by image data obtained when an image of the original document is read is inclined with respect to the main scanning direction.

Japanese Patent Laid-Open No. 2010-118911 describes a configuration in which a shadow caused by an edge (leading edge) on a leading end side of an original document in a conveyance direction is detected based on image data, and the leading edge is detected based on the detected shadow. Further, Japanese Patent Laid-Open No. 2010-118911 discloses a configuration in which the inclination amount of the leading edge with respect to the main scanning direction is detected based on the detected leading edge. Further, Japanese Patent Laid-Open No. 2010-118911 describes a configuration in which image data is subjected to a rotation correction so that a detected inclination is reduced.

For example, when the leading edge of the original document conveyed by the ADF has damage such as a cut or a break, the shadow corresponding to the damaged area becomes discontinuous in the main scanning direction with respect to the shadow corresponding to the undamaged area. As a result, the accuracy of detecting the leading edge is reduced. As a result, the detected inclination amount of the leading edge with respect to the main scanning direction is different from the actual inclination amount of the leading edge of the original document with respect to the main scanning direction. For example, in a case where the detected inclination amount is larger than the actual inclination amount of the original document, when the image data is corrected based on the detected inclination amount, the image after the correction is inclined in a direction opposite to the inclination direction of the image before the correction with respect to the main scanning direction.

SUMMARY OF THE INVENTION

An aspect of the present invention is to eliminate the above-mentioned problem with conventional technology.

According to a first aspect of the present invention, there is provided an image reading apparatus, comprising: a document tray on which an original document is to be placed; a conveyance unit that conveys the original document placed on the document tray; a regulating unit provided in the document tray that regulates a position of the original document in a width direction perpendicular to a conveyance direction in which the original document is conveyed; a reader that reads an image of the original document conveyed by the conveyance unit at a reading position, the reader includes a light receiving element that receives light and a generator that outputs image data representing a light reception result of the light receiving element, and a processor configured to function as: a first determiner that determines an inclination amount corresponding to an inclination angle of an edge on a leading end side of the original document in the conveyance direction with respect to a direction orthogonal to the conveyance direction, based on image data generated by the generator, a second determiner that determines the length of the original document in the conveyance direction, and a setting unit that sets a first value as a set value in a case that the length determined by the second determiner is a first length, and to set a second value larger than the first value as the set value in a case that the length determined by the second determiner is a second length shorter than the first length, wherein in a case that the inclination amount determined by the first determiner is smaller than the set value, inclination correction for correcting the image represented by the image data is performed such that the inclination amount is reduced, and in a case that the inclination amount determined by the first determiner is larger than the set value, the inclination correction is not performed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are diagrams for describing processing in an edge extraction unit of the controller according to the exemplary embodiment.

FIGS. 7A and 7B are flowcharts for describing a skew correction control in the controller according to the exemplary embodiment.

DESCRIPTION OF THE EMBODIMENTS

Embodiment of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Further, in the accompanying drawings, identical or similar components are denoted by identical reference signs, and redundant description will be omitted. In the exemplary embodiment, an example of an image reading apparatus according to the present invention will be described by taking a document reader as an example. The image reading apparatus is applicable not only to an image reader such as a scanner but also to an image forming apparatus such as a copying machine and a communication apparatus such as a facsimile apparatus.

Figure 1:
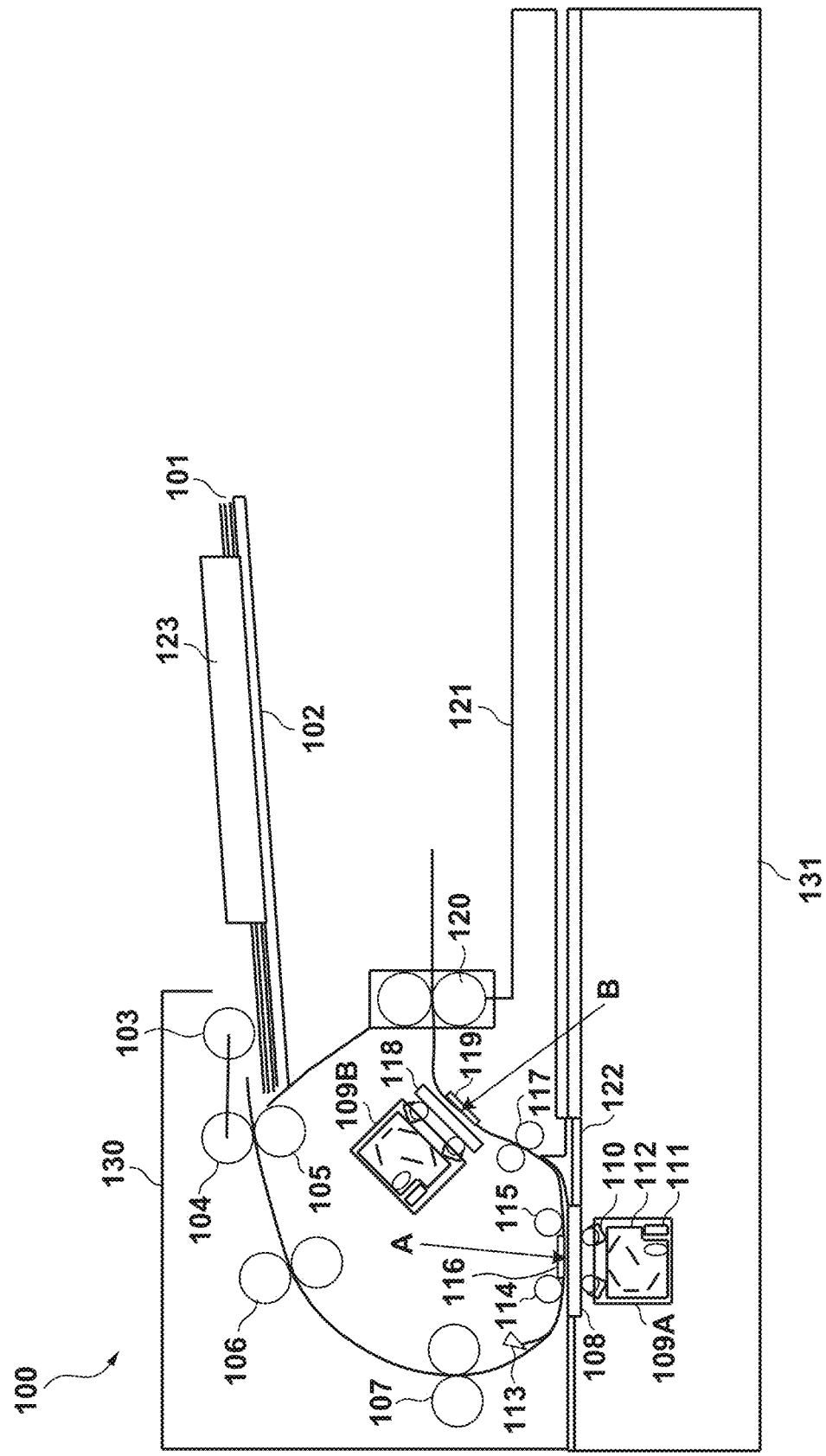
FIG. 1 depicts a cross-sectional view of a document reader according to an exemplary embodiment of the present invention.

FIG. 1 depicts a cross-sectional view of a document reader 100 according to an exemplary embodiment of the present invention. The document reader 100 includes an ADF 130 that conveys an original document 101 and a reader 131 that reads an image of the original document 101 conveyed by the ADF 130. The ADF 130 is attached to the housing of the reader 131 by a hinge (not illustrated) so as to be rotatable with respect to the reader 131. The reader 131 includes a front-side reading unit 109A and reads an image on a first side (front side) of the original document 101. The reader 131 includes a back-side reading unit 109B and reads an image on a second side (back side) of the original document 101.

The ADF 130 includes a document tray 102 on which an original document 101 is placed. A plurality of original documents 101 can be placed on the document tray 102, and the original documents are fed into the apparatus by rotation of a pickup roller 103 one by one in order from the uppermost original document. The pickup roller 103 is rotationally driven by a motor not illustrated. A plurality of original documents may be simultaneously fed by the pickup roller 103. A separation roller 104 and a separation roller 105 separate the original documents one by one. In this exemplary embodiment, the separation roller 104 is rotationally driven in the direction of conveying the original documents, and the separation roller 105 is not rotationally driven. The document tray 102 is provided with side regulating plates 123 on both sides, which contact the edge of the original document 101 in the width direction perpendicular to the conveyance direction of the original document 101 to regulate the position of the original document 101 in the width direction.

The original document 101 separated into one sheet by the separation roller 104 and the separation roller 105 is conveyed to the downstream by a pair of pre-conveying rollers 106. Thereafter, the original document 101 is conveyed to a front-side reading position A of the original document 101 by one pair of read rollers 107. A transparent front-side flow reading glass plate 108 is disposed at the front-side reading position A, and the front side of the original document 101 being conveyed is read by a front-side reading unit 109A which is stopped below the front-side flow reading glass plate 108.

The front-side reading unit 109A is provided with an LED 110, an image sensor 111 and an optical component group 112, and the front side of an original document 101 is illuminated by the LED 110, its reflection light is reflected and collected by the optical component group 112 and read by the image sensor 111. The image sensor 111 includes a plurality of photoelectric conversion elements arranged in the width direction described above. The direction in which the photoelectric conversion elements are arranged (width direction) is the main scanning direction. The front-side reading unit 109A reads the image of the original document 101 line by line in the main scanning direction. The plurality of photoelectric conversion elements receive the reflected light and photoelectrically convert the received reflected light to generate an electric signal. In the exemplary embodiment, the front-side reading unit 109A includes an A/D converter not illustrated, and converts an analog electric signal output from the image sensor 111 into a digital pixel data (image data) and outputs the digital pixel data to a controller 200 (FIG. 2) described later. The pixel data corresponds to data representing a light reception result of the photoelectric conversion element (pixel). That is, the image of the original document 101 is composed of a plurality of items of pixel data.

An original detection sensor 113 that detects a leading edge of the original document 101 is disposed upstream of the front-side reading position A on a conveyance path along which the original document 101 is conveyed. The controller 200 starts reading of an image by the front-side reading unit 109A at a predetermined timing between when the original detection sensor 113 detects the leading edge of the original document and when the leading edge of the original document 101 reaches the front-side reading position A. Further, the controller 200 detects the size of the original document in the sub-scanning direction (the length of the original document in the conveyance direction) based on the period from when the original detection sensor 113 detects the leading edge of the original document 101 to when the trailing edge of the original document passes through the original detection sensor 113 and the conveyance speed at which the original document is conveyed.

When the image of the original document 101 is read in a state in which the orientation of the original document 101 is unstable, the distance between the front-side reading unit 109A and the original document 101 becomes unstable, and the shadow of the edge of the leading end side of the original document, which will be described later, becomes unstable. Therefore, the original document 101 is pressed against the front-side flow reading glass plate 108 by an upstream-side pressing roller 114 and a downstream-side pressing roller 115. A white front side guide plate 116 is disposed between the upstream-side pressing roller 114 and the downstream-side pressing roller 115 at a position facing the front-side reading unit 109A.

The original document 101 passed through the front-side reading position A is conveyed to a back-side reading position B by one pair of post-conveyance rollers 117. A transparent back-side flow reading glass plate 118 is disposed at the back-side reading position B. The back-side reading unit 109B that reads the back side of the original document 101 is provided on the side opposite to the conveyance path with respect to the back-side flow reading glass plate 118. The back-side reading unit 109B in the present exemplary embodiment has the same hardware configuration as the front-side reading unit 109A.

The back-side reading unit 109B is controlled by the controller 200, and the controller 200 starts reading of an image by the back-side reading unit 109B at a predetermined timing between when the original detection sensor 113 detects the leading edge of the original document and when the leading edge of the original document 101 reaches the back-side reading position B. A white back side guide plate 119 is disposed at a position facing the back-side reading unit 109B. The original document 101 passed through the back-side reading position B is discharged to the outside of the apparatus by one pair of discharge rollers 120. The original document 101 thus discharged is stacked on the discharge tray 121. A white reference plate 122, which is a reference reading member for obtaining shading data, is disposed on the right side of the front-side flow reading glass plate 108 in the drawing.

Figure 2:
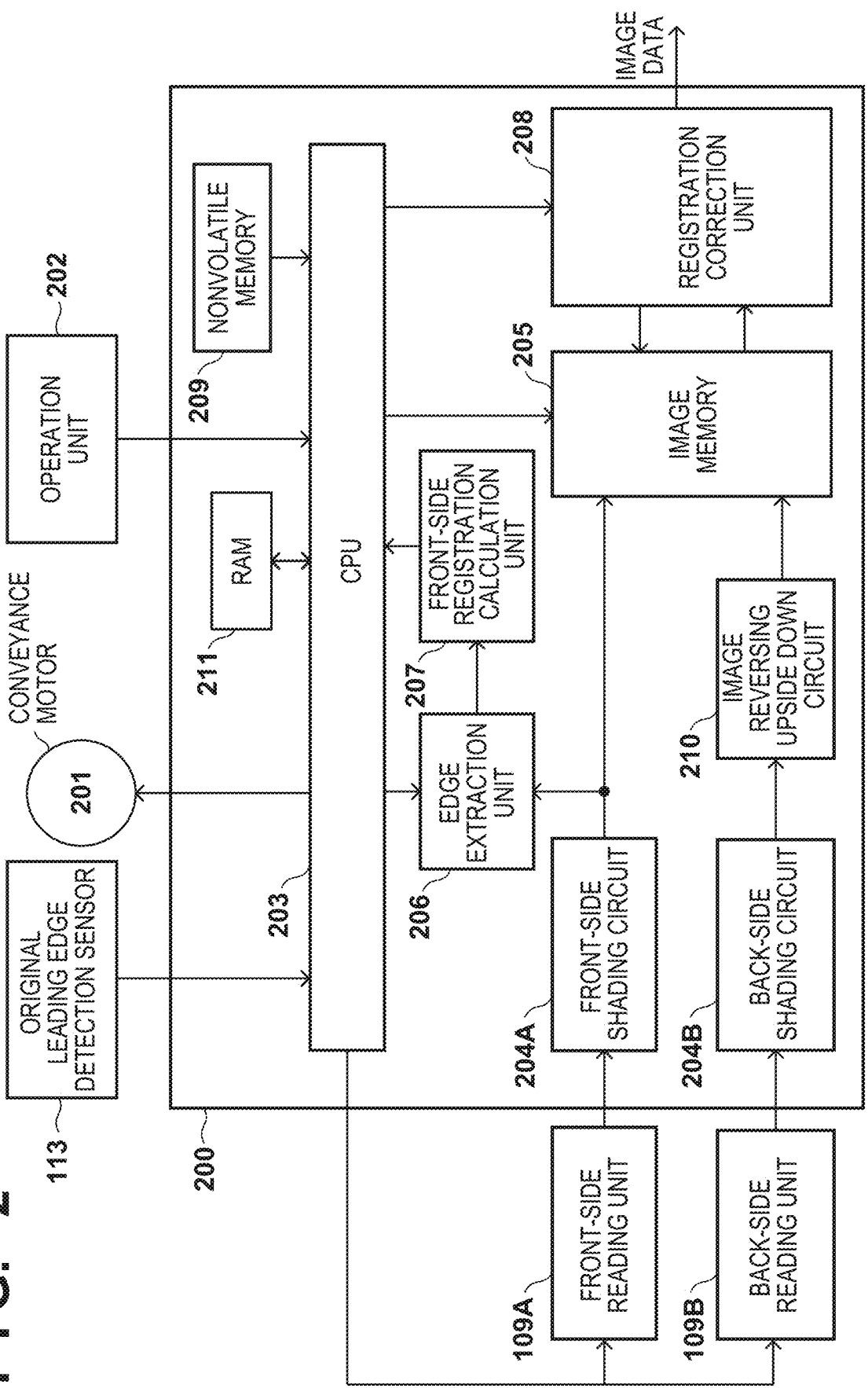
FIG. 2 is a block diagram for describing a configuration of a controller of the document reader according to the exemplary embodiment.

FIG. 2 is a block diagram for describing a configuration of the controller 200 of the document reader 100 according to the exemplary embodiment.

In addition to the front-side reading unit 109A, the back-side reading unit 109B, and the original detection sensor 113 described above, a conveyance motor 201 for rotationally driving each of the rollers described above in order to convey an original document, and an operation unit 202 for receiving various instructions from a user are connected to the controller 200.

The controller 200 includes a CPU 203 that controls a document reader 100 which includes a front-side reading unit 109A and a back-side reading unit 109B, and each image processing unit described later. The CPU 203 controls the operation of the document reader 100 by deploying a program stored in the nonvolatile memory 209 into the RAM 211 and executing the program. The RAM 211 provides a work area when the CPU 203 controls, and temporarily stores various data. The CPU 203 starts control of the document reader 100 according to an instruction from the operation unit 202. When a reading instruction is issued from the operation unit 202, the CPU 203 drives the conveyance motor 201 to convey the original document 101, and drives the front-side reading unit 109A and the back-side reading unit 109B. The front-side reading unit 109A and the back-side reading unit 109B turn on the LED 110 when a driving instruction is issued from the CPU 203, convert into digital image data based on the reflected light, and transmit the digital image data to the controller 200. The digital image data indicates a higher numerical value as the intensity of the reflected light is higher. This level is hereinafter referred to as a brightness level.

The image sensor 111 according to the exemplary embodiment includes 7500 pixels for receiving light of three colors of red (R), green (G), and blue (B) for each of the three lights in the main scanning direction.

The digital image data output from the front-side reading unit 109A is input to a front-side shading circuit 204A of the controller 200, and the digital image data output from the back-side reading unit 109B is input to a back-side shading circuit 204B. The front-side shading circuit 204A and the back-side shading circuit 204B perform addition, subtraction, multiplication, and division on the input digital image data to correct (shading correction) the influence of unevenness of the light amount of LED 110 and the unevenness of sensitivity of each pixel of the image sensor 111, thereby generating uniform image data in the main scanning direction. The image data of the front side subjected to the shading correction is stored in the image memory 205 at a predetermined timing.

The back side image data passes through an image reversing upside down circuit 210 before being stored in the image memory 205. The back-side reading unit 109B in the exemplary embodiment has the same configuration as the front-side reading unit 109A, and the back-side reading unit 109B is installed in a vertically inverted form without changing the direction of the main scanning direction with respect to the front-side reading unit 109A. Therefore, the image data read by the back-side reading unit 109B is reversed in the main scanning direction with respect to the image data obtained by the front-side reading unit 109A. Therefore, the image data read by the back-side reading unit 109B is further inverted in the main scanning direction by the image reversing upside down circuit 210 before being stored in the image memory 205, and is stored in the image memory 205.

Figure 3A:
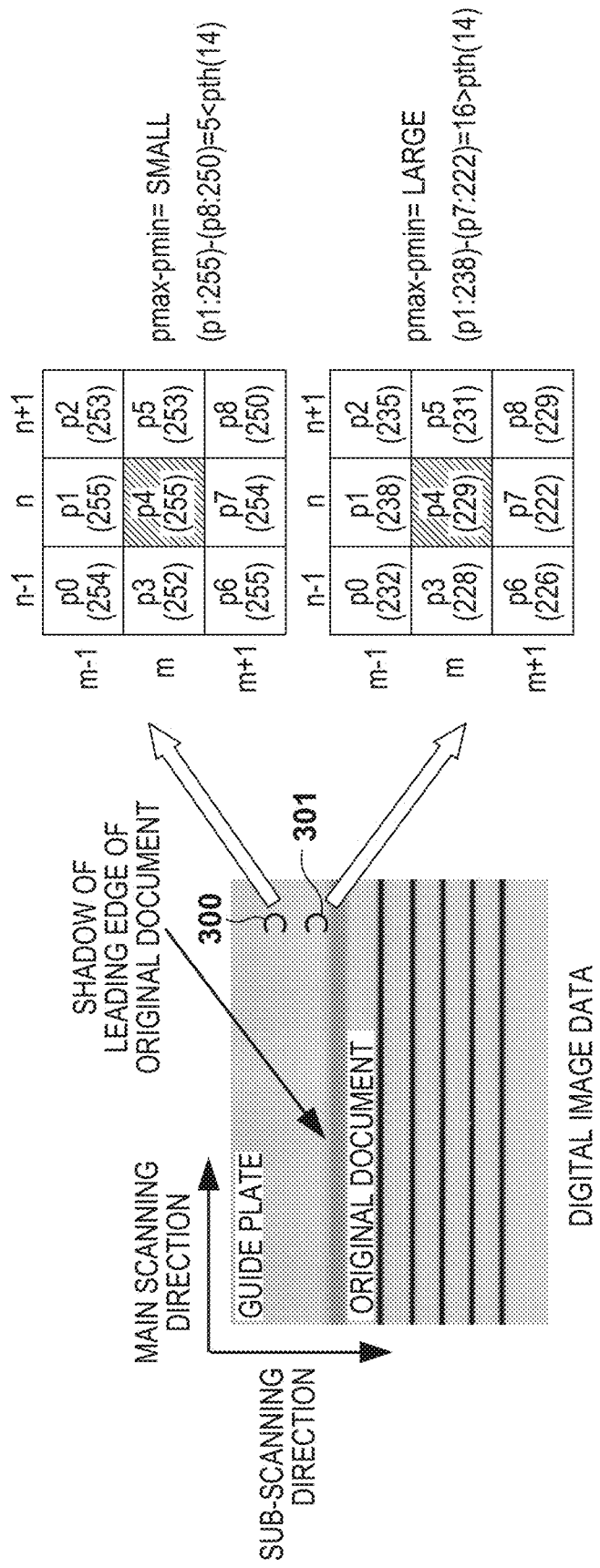

FIGS. 3A and 3B are diagrams for describing processing in an edge extraction unit 206 of the controller 200 according to the exemplary embodiment.

FIG. 3A is a diagram for describing a part of a digital image data obtained by reading an original document by the front-side reading unit 109A. FIGS. 3A and 3B illustrate images obtained by combining, in the sub-scanning direction, the columns of pixels in the main scanning direction obtained by the front-side reading unit 109A at predetermined time intervals after the start of reading the image at the front-side reading position A. As described above, since the reading of the image at the front-side reading position A is started at the timing before the leading edge of the original document reaches the front-side reading position A, when the reading of the image by the front-side reading unit 109A is started, first, the white guide plate 116 is read. Thereafter, as the original document is conveyed, the image of the original document is read. That is, the front side image data input to the edge detection unit 206 includes image data indicating the guide plate 116 and image data indicating the edge (leading edge) on the leading end side of the original document 101.

The edge extraction unit 206 performs binarization processing on the image data by using an area of 9 pixels (3 pixels in the main scanning direction×3 pixels in the sub-scanning direction) as one block. In FIG. 3A, the pixel position in the main scanning direction is denoted by n ($1 \leq n \leq 7500$), the pixel position in the sub-scanning direction is denoted by m ($1 \leq m \leq 12000$), and the brightness value of each pixel is denoted by px (x=0 to 8). The edge extraction unit 206 calculates the difference between the maximum value pmax and the minimum value pmin of the brightness values for 9 pixels in each block.

As indicated by reference numeral 300 in the drawing, where all of the 9 pixels are the guide plate (white), all of the 9 pixels are white pixels, and thus the difference between pmax and pmin is a small value. On the other hand, as indicated by reference numeral 301 in the drawing, at the boundary between the guide plate (white) and the shadow (gray) of the leading end of the original document, white pixels and gray pixels are mixed in 9 pixels, and thus the difference between pmax and pmin becomes large. Therefore, when the difference between pmax and pmin is larger than a predetermined threshold pth, the edge extraction unit 206 determines that there is a pixel (hereinafter, referred to as an edge candidate pixel) that is a candidate for an edge (leading edge) on the leading end side of the original document in the block. Specifically, the edge extraction unit 206 determines the center pixel (pixel at coordinates (n, m)) as an edge candidate pixel when the following equation (1) is satisfied.

$$p\text{max} - p\text{min} \geq pth \qquad \text{equation (1)}$$

The edge extraction unit 206 determines the leading edge of the original document 101 by performing this determination process for each of n and m except for n=1, n=7500, m=1, and m=12000.

FIG. 3B depicts a view illustrating an example of image data obtained by binarizing the image data in FIG. 3A with pth=14. The pixels illustrated in white are edge candidate pixels that satisfy the above equation (1). Among the plurality of edge candidate pixels illustrated in FIG. 3B, a row of edge candidate pixels in the main scanning direction that is closest to the leading edge in the sub-scanning direction (a pixel row in the main scanning direction that is first determined to be an edge candidate pixel in the sub-scanning direction) is detected as the leading edge of the original document.

The binarized data output from the edge extraction unit 206 is input to a front-side registration calculation unit 207. The front-side registration calculation unit 207 calculates registration information of the original document from the binarized data.

Figure 4:
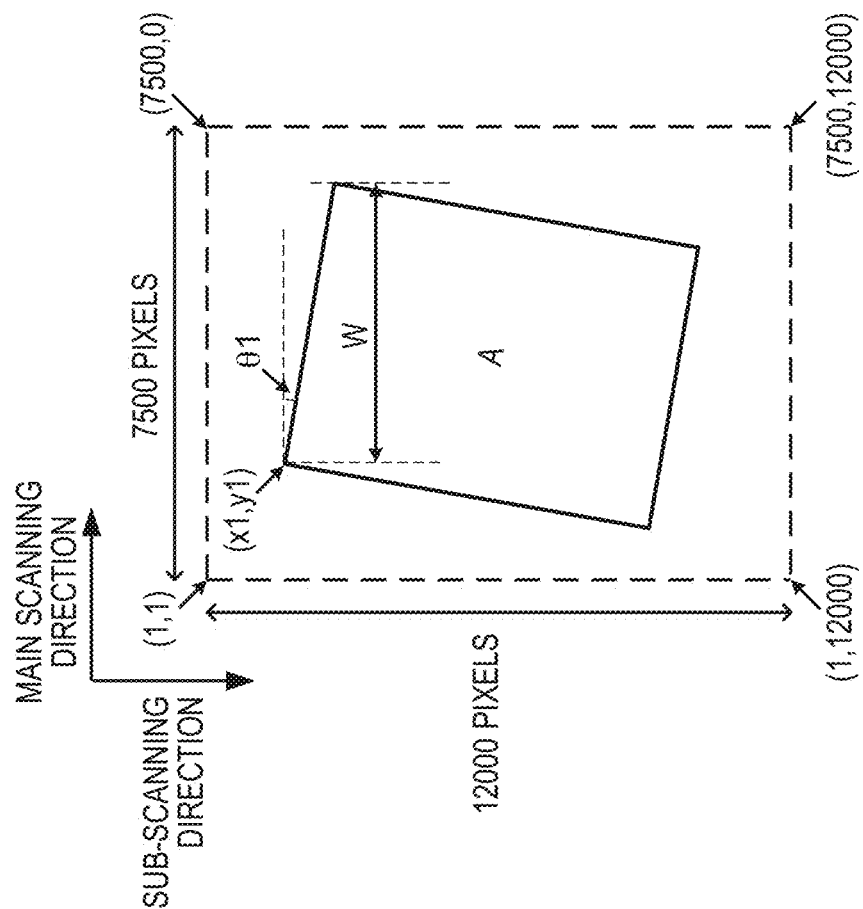
FIG. 4 is a diagram for describing a registration calculation method in a front-side registration calculation unit according to the exemplary embodiment.

FIG. 4 is a diagram for describing a method of calculating registration information in the front-side registration calculation unit 207 according to the exemplary embodiment. The image indicated by the binarized data input to the front-side registration calculation unit 207 is an image in a range indicated by a dotted line in FIG. 4 and includes the original document 101. The range of the dotted line is n=1 to 7500 and m=1 to 12000. The front-side registration calculation unit 207 calculates registration information based on the input binarized data. Here, the front side registration information is information including the position and angle of the original document in the front image. The position of the original document 101 is a position (x1, y1) of a predetermined first position of the original document 101 in the front side image. In the exemplary embodiment, the first position is defined as one (left side in FIG. 4)) of the two end portions of the leading edge of the original document 101. The angle of the original document 101 is an angle of a predetermined side of the original document 101 in the front image with respect to a reference direction of the front image. In the exemplary embodiment, the predetermined side is the leading edge of the original document 101, and the reference direction is the main scanning direction. That is, the angle of the original document 101 is θ1 in FIG. 4. When the leading edge is inclined to the upstream of the position (x1, y1) in the conveyance direction, the angle θ1 takes a negative value, and when the leading edge is inclined to the downstream of the position (x1, y1), the angle θ1 takes a positive value. In addition, the front-side registration calculation unit 207 calculates a distance (width) W, in the main scanning direction, between two end portions of the leading edge of the original document 101. Then, the front-side registration calculation unit 207 outputs the registration information and the width W to the CPU 203.

The CPU 203 transmits the original document leading edge angle θ1, the angle direction, and the upper left coordinate (x1, y1) calculated by the front-side registration calculation unit 207 to a registration correction unit 208. The registration correction unit 208 corrects (reduces) the inclination of the image by rotating the image data so as to reduce the original document leading edge angle θ1 by using the original document leading edge angle θ1, the angle direction, and the upper left coordinate (x1, y1). That is, the registration correction unit 208 reads out the image data of the first side (front side) stored in the image memory 205 while performing registration correction by using the original document leading edge angle θ1, the angle direction, and the upper left coordinate (x1, y1). To be more specific, the registration correction is performed by reading out the image data from the image memory 205 along the side of the leading edge of the original document image from the upper left coordinate (x1, y1) (along the direction of the original document leading edge angle θ1), for example. The registration correction may be performed by, for example, general affine transformation or the like.

Figure 5:
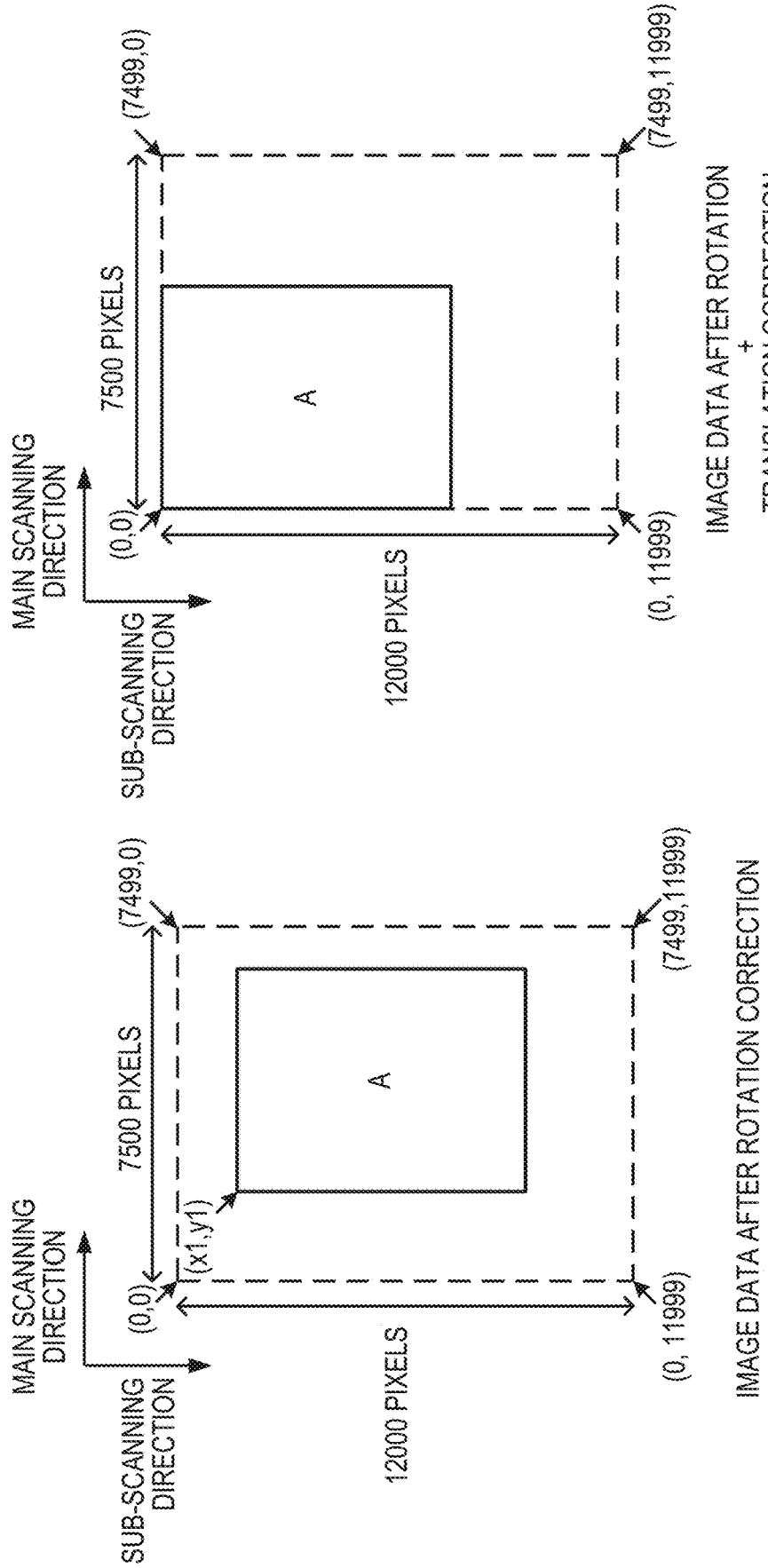
FIGS. 5A and 5B are diagrams for describing registration correction processing by a registration correction unit according to the exemplary embodiment.

FIGS. 5A and 5B are diagrams for describing registration correction processing by the registration correction unit 208 according to the exemplary embodiment.

FIG. 5A depicts a view illustrating an example of a state in which the image data that indicates an image of FIG. 4 is converted so that the side of the leading edge of the original document 101 is parallel to the main scanning direction. FIG. 5B depicts a view illustrating an example of a state in which the image of FIG. 5A is translated so that the first position of the original document becomes the reference position.

By this processing, the image data is in a state where the first position of the original document 101 becomes the reference position (0, 0) of the image and the skew is corrected. The registration correction unit 208 outputs the image data subjected to the registration correction to, for example, a memory not illustrated, or the like.

Figure 6:
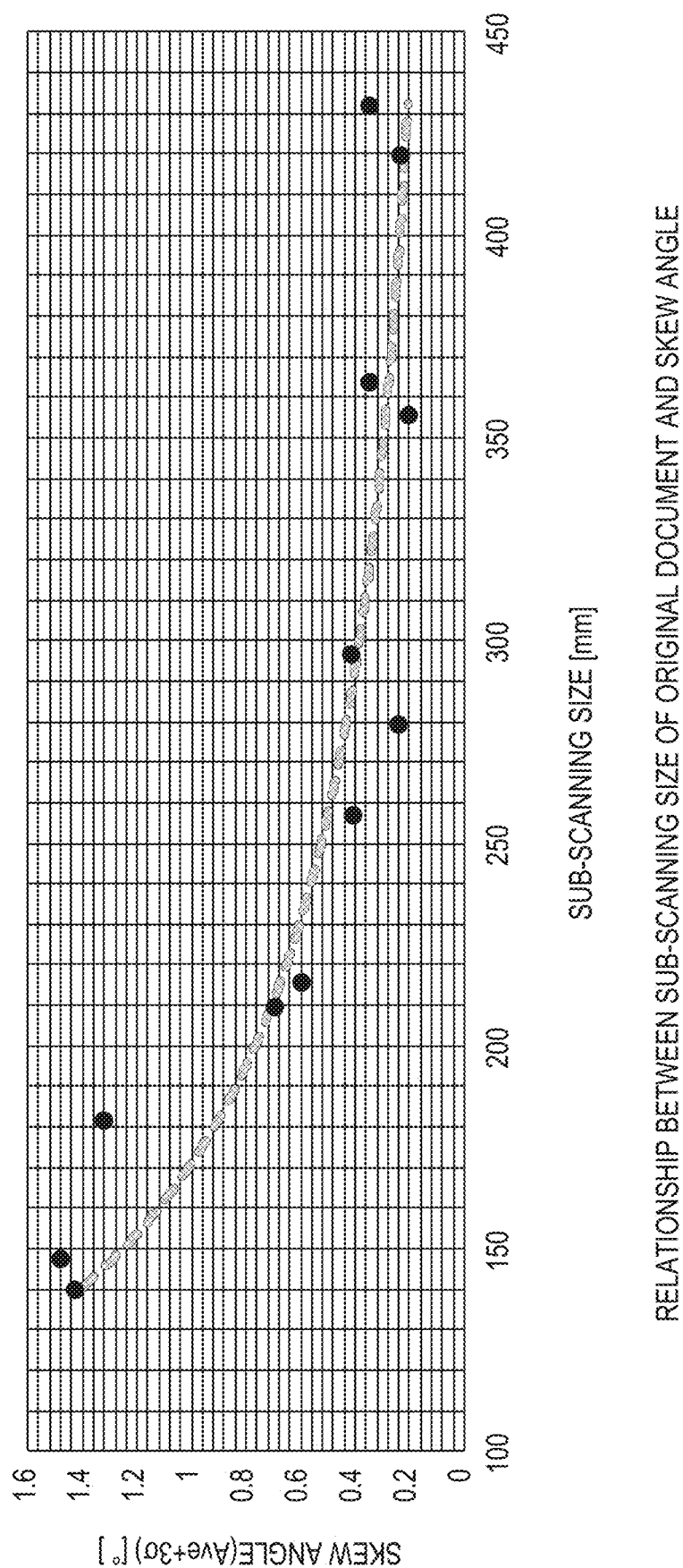
FIG. 6 is a graph for describing the relationship between the size of the original document in the sub-scanning direction (the length of the original document in the conveyance direction) and the skew angle.

FIG. 6 is a graph for describing the relationship between the size of the original document in the sub-scanning direction (the length of the original document in the conveyance direction) and the inclination amount (skew angle) of the leading edge of the original document. In this graph, the horizontal axis represents the size of the original document in the sub-scanning direction, and the vertical axis represents the skew angle of the original document.

The numerical values plotted in FIG. 6 are 3σ numerical values of average values obtained by reading various original documents a plurality of times. The dotted line is an approximate curve of these plots. As illustrated in the graph, it can be seen that the larger the size of the original document in the sub-scanning direction (the longer the length in the conveyance direction), the less likely the original document is to be skewed. This is because the longer the length of the original document in the conveyance direction, the more the original document is conveyed in a state where the trailing edge side of the conveyed original document is regulated by the side regulating plates 123. That is, as the length of the original document in the conveyance direction is longer, the side regulating plate regulates the position of the original document in the width direction, so that the original document is less likely to be skewed.

Figure 7A:
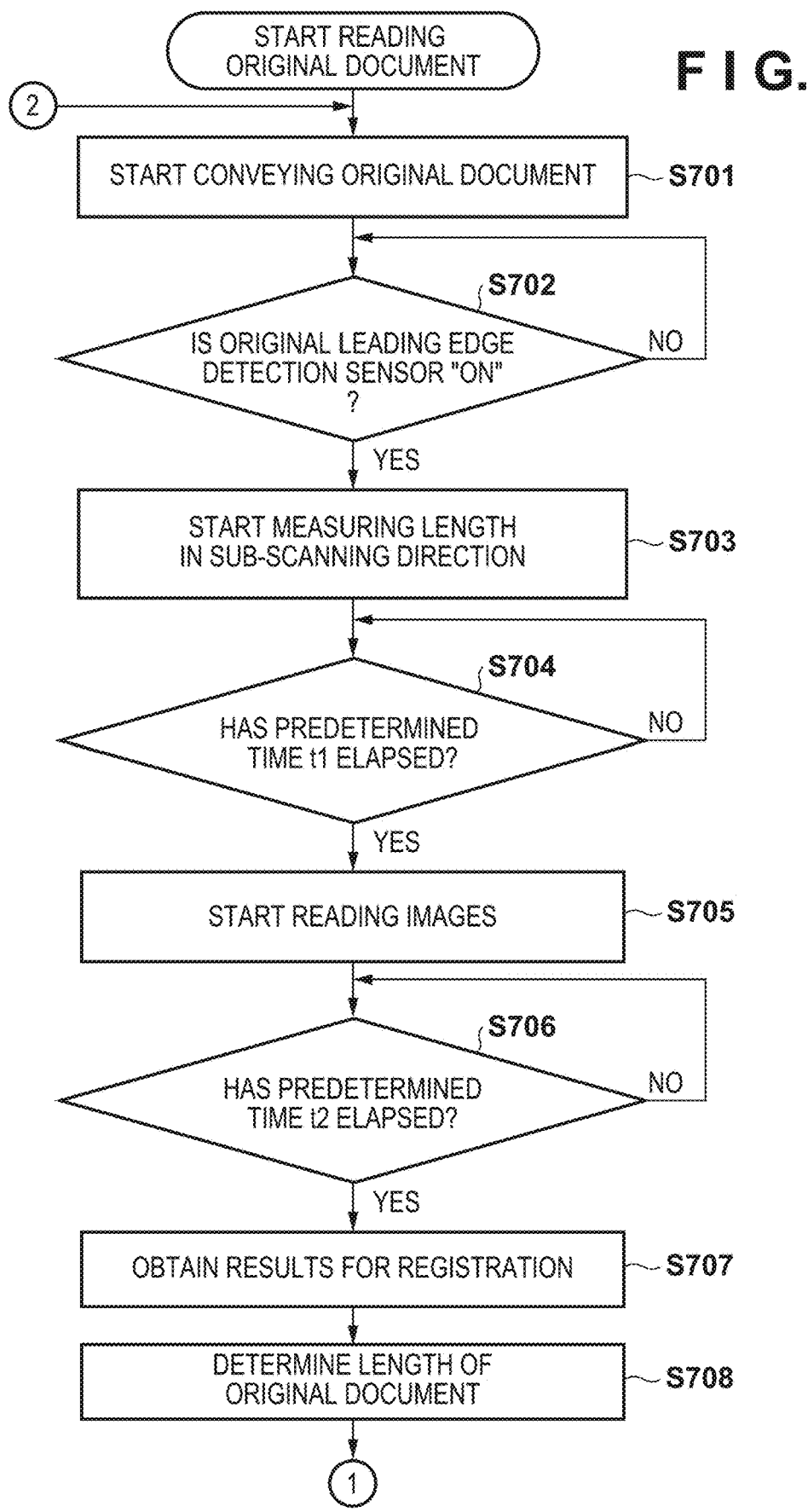

FIGS. 7A and 7B are flowcharts for describing skew correction control in the controller 200 according to the exemplary embodiment. The processing described in this flowchart is realized by executing the program deployed in RAM 211 by CPU 203.

The processing described in this flowchart is started by inputting an original document reading start instruction, and first, in step S701, the original documents 101 on the document tray 102 are conveyed one by one by CPU 203. Next, proceeding to step S702, the CPU 203 determines whether the original detection sensor 113 has been turned on, that is, whether the original detection sensor 113 has detected the leading edge of the original document. When the original detection sensor 113 is turned on, the process proceeds to step S703. In step S703, CPU 203 starts measurement of a length of the original document in the sub-scanning direction. Next, proceeding to step S704, CPU 203 measures a predetermined time t1 after the original detection sensor 113 is turned on, and when t1 elapses, the process proceeds to step S705. The predetermined time t1 is shorter than the period from when the original detection sensor 113 detects the leading edge of the original document to when the leading edge of the original document reaches the front-side reading position A. The predetermined time is measured by a timer (not illustrated) included in the CPU 203.

In step S705, CPU 203 starts reading the image of the original document by the front-side reading unit 109A. Then, the process proceeds to step S706, and CPU 203 measures a predetermined time t2, and when t2 has elapsed, the process proceeds to step S707. In step S707, detection of the leading edge by the edge extraction unit 206 is started. Further, the calculation of the registration information by the registration calculation unit 207 is executed, the calculation of the original document leading edge angle θ1, the sign of the angle, the upper left coordinate (X1, Y1), and the width W is completed, and these are transmitted to CPU 203. Therefore, the predetermined time t2 is a standby time until the registration calculation unit 207 executes the calculation of the registration information.

Next, the process proceeds to step S708, and CPU 203 determines the size of the original document in the sub-scanning direction, based on the time from when the original detection sensor 113 is turned on to when the original detection sensor 113 is turned off (the trailing edge of the original document passes through the original detection sensor 113) in step S703, and the conveyance speed of the original document. Then, in step S709, the CPU 203 determines whether the length of the original document in the sub-scanning direction is 250 mm or more (a predetermined length or more). Here, when it is determined that the original document is 250 mm or more in the sub-scanning direction, the process proceeds to step S710, and when determined that the original document is shorter than 250 mm in the sub-scanning direction, the process proceeds to step S714.

In step S710, CPU 203 sets the threshold for skew correction to a first predetermined value (e.g., 1.5°). In step S711, CPU 203 determines whether the skew angle θ1 of the leading edge of the original document obtained in step S707 is a first predetermined value or smaller, and when the skew angle θ1 of the leading edge of the original document is 1.5° or smaller, the process proceeds to step S712, and when the skew angle θ1 of the leading edge of the original document is larger than 1.5°, the process proceeds to step S713. In step S712, the CPU 203 determines to perform registration correction, performs registration correction so as to reduce the skew angle θ1 of the document leading edge acquired in step S707, and outputs the registration-corrected image data to proceed to S718. On the other hand, in step S713, CPU 203 outputs the image data without performing the registration correction, and proceeds to step S718. The first predetermined value is set, for example, to a value greater than the skew angle that may occur when an original document that is 250 mm or more in the sub-scanning direction is conveyed. The skew angle that may occur when an original document that is 250 mm or more in the sub-scanning direction is conveyed is calculated in advance by experiments.

In step S714, CPU 203 sets the threshold for skew correction to a second predetermined value (e.g., 3°). Next, the process proceeds to step S715, and CPU 203 determines whether the skew angle θ1 of the leading edge of the original document is a second predetermined value or smaller, and when the skew angle θ1 of the leading edge of the original document is 3° or smaller, the process proceeds to step S716, and when the skew angle θ1 of the leading edge of the original document is greater than 3°, the process proceeds to step S717. In step S716, the CPU 203 determines to perform the registration correction, and the registration correction is performed as described above so that the skew angle θ1 of the document leading edge acquired in step S707 is reduced, and the image data on which the registration correction is performed is output and the process proceeds to step S718.

The second predetermined value is set, for example, to a value greater than the skew angle that may occur when an original document that is shorter than 250 mm in the sub-scanning direction is conveyed. The skew angle that may occur when an original document that is shorter than 250 mm in the sub-scanning direction is conveyed are calculated in advance by experiments.

On the other hand, in step S717, CPU 203 outputs the image data without performing the registration correction, and the process proceeds to step S718. In step S718, CPU 203 determines whether or not the reading out of the image data stored in the image memory 205 is completed, and when the reading out is completed, the process proceeds to step S719. In step S719, CPU 203 determines whether or not the next original document is placed on the document tray 102, and when it is determined that the next original document is placed, the process proceeds to step S701, and when determined that no original document is placed, this process is completed.

The length of the original document in the sub-scanning direction and the first and second predetermined values of the skew angle used in the above description are merely examples, and may be changed in accordance with the configuration of the conveyance unit of the ADF. In the exemplary embodiment, the second predetermined value is 2 times the first predetermined value. However, the second predetermined value may be about 1.5 to 3 times the first predetermined value.

As described above, according to the exemplary embodiment, the threshold of the skew angle for determining whether to perform registration correction of image data obtained by reading an original document is determined in accordance with the length of the original document in the conveyance direction. Accordingly, for example, even when the skew angle of the original document is erroneously detected due to damage, break, or the like of the original document, it is possible to provide appropriate image data without performing excessive registration correction on the image data. That is, it is possible to accurately correct the image data representing the read image (it is possible to prevent the image after the inclination correction from being inclined in a direction opposite to the inclination direction of the image before the correction).

In the present exemplary embodiment, registration correction is not performed in S713 and S717 in FIG. 7B, but this is not a limitation. For example, in S713 and S717, the registration correction may be performed by predetermined angles smaller than S712 and S716.

In the present exemplary embodiment, the length of the original document in the conveyance direction is determined (acquired) based on the detection result of the original leading edge detection sensor 113 provided in the conveyance path, but this is not a limitation. For example, the length of the original document in the conveyance direction may be determined (obtained) based on a detection result of a sensor that is provided in the document tray 102 and that detects the length of the original document in the conveyance direction.

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-207356, filed Nov. 15, 2019 and Japanese Patent Application No. 2020-172136, filed Oct. 12, 2020, which are hereby incorporated by reference herein in their entirety.

What is claimed is:

1. An image reading apparatus, comprising:
 a document tray on which an original document is to be placed;
 a conveyance unit that conveys the original document placed on the document tray;
 a regulating unit provided in the document tray that regulates a position of the original document in a width direction perpendicular to a conveyance direction in which the original document is conveyed;
 a reader that reads an image of the original document conveyed by the conveyance unit at a reading position, the reader includes a light receiving element that receives light and a generator that outputs image data representing a light reception result of the light receiving element, and
 a processor configured to function as:
   a first determiner that determines an inclination amount corresponding to an inclination angle of an edge on a leading end side of the original document in the conveyance direction with respect to a direction orthogonal to the conveyance direction, based on image data generated by the generator,
   a second determiner that determines the length of the original document in the conveyance direction, and
   a setting unit that sets a first value as a set value in a case that the length determined by the second determiner is a first length, and to set a second value larger than the first value as the set value in a case that the length determined by the second determiner is a second length shorter than the first length,
 wherein in a case that the inclination amount determined by the first determiner is smaller than the set value, inclination correction for correcting the image represented by the image data is performed such that the inclination amount is reduced, and in a case that the inclination amount determined by the first determiner is larger than the set value, the inclination correction is not performed.

2. The image reading apparatus according to claim 1 further comprising:
 a light source configured to emit light; and
 a facing member, at a reading position at which the reading unit reads an image of the original document, provided on a side opposite to the reading unit with respect to a conveyance path along which the original document is conveyed,
 wherein the processor is configured to further function as a detector that detects a shadow generated on the facing member by a light emitted from the light source and the original document being conveyed,
 wherein the first determiner determines the inclination amount based on the image data corresponding to the shadow.

3. The image reading apparatus according to claim 2, wherein the facing member is a white member.

4. The image reading apparatus according to claim 2, wherein the image data includes a brightness value indicating intensity of light received by the light receiving element, and
 the detector detects the shadow based on the brightness value.

5. The image reading apparatus according to claim 1 further comprising a sensor that detects the presence or absence of the original document placed on the document tray,
 wherein the second determiner determines a length of the original document in the conveyance direction based on a detection result of the sensor.

* * * * *